(12) United States Patent
Mani et al.

(10) Patent No.: US 10,728,092 B2
(45) Date of Patent: Jul. 28, 2020

(54) CLOUD-MASTERED SETTINGS

(71) Applicant: Microsoft Technology Licensing, LLC, Redmond, WA (US)

(72) Inventors: Seshadri Mani, Redmond, WA (US); Robert G. Hawking, Seattle, WA (US); Omid Mola, Redmond, WA (US); Dongping (Donna) Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 14/854,558

(22) Filed: Sep. 15, 2015

(65) Prior Publication Data

US 2016/0323142 A1    Nov. 3, 2016

Related U.S. Application Data

(60) Provisional application No. 62/155,596, filed on May 1, 2015.

(51) Int. Cl.
| | |
|---|---|
| *G06F 15/173* | (2006.01) |
| *H04L 12/24* | (2006.01) |
| *H04L 29/08* | (2006.01) |
| *G06F 9/50* | (2006.01) |
| *G06F 8/71* | (2018.01) |
| *G06F 16/17* | (2019.01) |
| *G06F 16/907* | (2019.01) |

(52) U.S. Cl.
CPC ............ *H04L 41/0816* (2013.01); *G06F 8/71* (2013.01); *G06F 9/5077* (2013.01); *G06F 16/173* (2019.01); *G06F 16/907* (2019.01); *H04L 67/142* (2013.01); *H04L 67/2804* (2013.01)

(58) Field of Classification Search
CPC ............ H04L 41/0816; H04L 67/2804; H04L 67/142; G06F 8/71; G06F 9/5077; G06F 17/30141; G06F 8/60
USPC ........................................................ 709/223
See application file for complete search history.

(56) References Cited

U.S. PATENT DOCUMENTS

| | | |
|---|---|---|
| 7,664,866 B2 | 2/2010 | Wakefield |
| 9,003,006 B2 | 4/2015 | Xia et al. |

(Continued)

FOREIGN PATENT DOCUMENTS

WO    2014114727 A1    7/2014

OTHER PUBLICATIONS

International Search Report and Written Opinion for International Patent Application No. PCT/US2016/029904, dated Aug. 19, 2016, date of filing: Apr. 29, 2016, 10 pages.

(Continued)

*Primary Examiner* — Brian Whipple
*Assistant Examiner* — Hannah S Wang
(74) *Attorney, Agent, or Firm* — Christopher J. Volkmann; Kelly, Holt & Christenson, PLLC

(57) ABSTRACT

A settings management system in a remote server environment generates user interface displays with settings management user input mechanisms, and detects actuation of those user input mechanisms. Settings configuration metadata is generated, for a given setting, based upon the detected actuation. The settings metadata is output for access by a plurality of different, heterogeneous, computing environments, and the settings metadata is consistent across all of those environments.

18 Claims, 9 Drawing Sheets

(56) References Cited

U.S. PATENT DOCUMENTS

| | | | |
|---|---|---|---|
| 9,009,313 | B2 | 4/2015 | Rice et al. |
| 2004/0123091 | A1 | 6/2004 | Das |
| 2005/0188117 | A1* | 8/2005 | Brown ............... G06F 9/44505 710/8 |
| 2006/0271772 | A1* | 11/2006 | Woundy ............. G06F 9/44505 713/1 |
| 2007/0245013 | A1 | 10/2007 | Saraswathy et al. |
| 2011/0055399 | A1 | 3/2011 | Tung et al. |
| 2011/0231899 | A1 | 9/2011 | Pulier et al. |
| 2012/9099149 | | 4/2012 | Sunkara et al. |
| 2012/0124211 | A1 | 5/2012 | Kampas et al. |
| 2012/0281706 | A1 | 11/2012 | Agarwal et al. |
| 2012/0281708 | A1 | 11/2012 | Chauhan et al. |
| 2012/0297016 | A1 | 11/2012 | Iyer et al. |
| 2013/0073716 | A1 | 3/2013 | Dejana et al. |
| 2013/0198717 | A1* | 8/2013 | Igelka ...................... G06F 8/71 717/121 |
| 2014/0013246 | A1 | 1/2014 | Beechuk et al. |
| 2014/0067780 | A1 | 3/2014 | Lipscomb et al. |
| 2014/0075501 | A1 | 3/2014 | Srinivasan et al. |
| 2014/0280595 | A1 | 9/2014 | Mani et al. |
| 2014/0280918 | A1 | 9/2014 | Grandhe et al. |
| 2015/0066853 | A1 | 3/2015 | Martin |
| 2015/0347240 | A1* | 12/2015 | Elias ................... G06F 11/1464 714/19 |
| 2016/0179499 | A1* | 6/2016 | Reeves ..................... G06F 8/61 717/172 |
| 2017/0237459 | A1* | 8/2017 | Kim ...................... H04B 1/385 455/575.6 |

OTHER PUBLICATIONS

"Hybrid Identity", In White Paper, Retrieved on: Apr. 28, 2015, 36 pages.

Shinder, Thomas W, "Modern Datacenter Architecture Patterns—Hybrid Networking", Published on: Dec. 2, 2014, Available at: http://blogs.technet.com/b/privatecloud/archive/2014/12/02/modern-datacenter-architecture-patterns-infrastructure.aspx.

"Cloud Computing System Architecture Diagrams", Published on: Jan. 25, 2012, Available at: https://support.rightscale.com/12-Guides/Designers_Guide/Cloud_Solution_Architectures/Cloud_Computing_System_Architecture_Diagrams/.

"Cross-Origin Resource Sharing (CORS)", Published on: Dec. 28, 2014, Available at: https://cloud.google.com/storage/docs/cross-origin.

Vaile, et al., "Data Sovereignty and the Cloud", Published on: Jul. 2013, Available at: http://www.cyberlawcentre.org/data_sovereignty/CLOUD_DataSovReoprt_Full.pdf.

Simms, et al., "Best Practices for the Design of Large-Scale Services on Azure Cloud Services", Published on: Apr. 17, 2014, Available at: https://msdn.microsoft.com/en-us/library/azure/jj717232.aspx.

Agrawal, et al., "Managing Geo-replicated Data in Multi-datacenters", In Proceedings of 8th International Workshop on Databases in Networked Information Systems, Mar. 25, 2013, 21 pages.

Ye, et al., "A Two-layer Geo-cloud based Dynamic Replica Creation Strategy", In Journal of Applied Mathematics & Information Sciences, vol. 3, No. 1, Jan. 1, 2014, pp. 414-440.

Application and Drawings for U.S. Appl. No. 14/874,156, filed Oct. 2, 2015, 46 pages.

International Search Report and Written Opinion for International Patent Application No. PCT/US2016/053643, dated Dec. 16, 2016, filing date: Sep. 26, 2015, 10 pages.

Katzer et al.: "Office 365 Administration Guide Enterprise", Jan. 4, 2014, Retrieved from the Internet: <URL:https://rd.springer.com/chapter/10.1007/978-1-4302-6527-6_8>, <Retrieved on Dec. 6, 2016>, 64 pages.

International Preliminary Report on Patentability for International Patent Application No. PCT/US2016/029904, dated Jan. 31, 2017, date of filing: Apr. 29, 2016, 7 pages.

"Second Written Opinion Issued in PCT Application No. PCT/US2016/053643", dated Jul. 18, 2017; 5 Pages.

"Docave Administrator for Microsoft® Sharepoint® Administration", Published on: Apr. 7, 2015, Available at: http://www.avepoint.com/assets/pdf/doc6/DocAve_Administrator_for_SharePoint_Administration.pdf.

"AvePoint Releases New Features to Enhance On-Premises, Cloud & Hybrid Microsoft SharePoint Environments with DocAve 6", Published on: Feb. 10, 2015, Available at: http://www.avepoint.com/news-releases/2015/02/10/avepoint-releases-new-features-to-enhance-on-premises-cloud-hybrid-microsoft-sharepoint-environments-with-docAve6/.

"VMware Master Hybrid Cloud Management with VMware vRealize Suit", Published on: Jul. 9, 2014, Available at: https://www.vmware.com/files/pdf/management/VMware-Management-Brochure.pdf.

"The Power of a Flexible Platform Private, Public, or Hybrid Cloud", Published on: Feb. 9, 2015, Available at: https://www.egnyte.com/how-enterprise-file-services-works.html.

"Manage Multiple Clouds with Vistara", Published on: Apr. 6, 2015, Available at: http://www.vistarait.com/solutions/cloud/.

Chen, et al., "SDNBroker: Heterogeneous Cloud Serving Systems over Software-Defined Networking", In Proceedings of International Conference on Computer, Information and Telecommunications Systems, Jul. 7, 2014, 5 pages.

Breiter, et al., "A Framework for Controlling and Managing Hybrid Cloud Service Integration", In Proceedings of IEEE International Conference on Cloud Engineering, Mar. 25, 2013, pp. 217-224.

Araujo, et al., "Hybrid Cloud Integration and Monitoring with IBM WebSphere Cast Iron", Published on: Dec. 2012, Available at: http://www.redbooks.ibm.com/redbooks/pdfs/sg248016.pdf.

"Unified Communication and Collaboration Managed Services Hybrid Managed Service", Retrieved on: Apr. 27, 2015, Available at: http://www.avanade.com/~/media/documents/resources/bts/hybrid-managed-service-brochure.pdf.

Vecchiola, et al., "Aneka—Integration of Private and Public Clouds", In Proceedings of Cloud Computing Principles and Paradigms, Jan. 2011, 26 pages.

"Second Written Opinion Issued in PCT Application No. PCT/US2016/029904", dated Nov. 4, 2016, 6 Pages.

"International Preliminary Report on Patentability Issued in PCT Application No. PCT/US2016/053643", dated Jan. 26, 2018, 07 Pages.

"Non Final Office Action Issued in U.S. Appl. No. 14/874,156", dated Sep. 19, 2018; 9 Pages.

"Office Action Issued in European Patent Application No. 16725636.1", dated Feb. 13, 2019, 6 Pages.

"Final Office Action Issued in U.S. Appl. No. 14/874,156", dated Jun. 3, 2019, 9 Pages.

"Office Action Issued in European Patent Application No. 16781604.0" dated Mar. 19, 2019, 6 Pages.

Katzer, et al., "Office 365 Administration Guide Enterprise", Mailed Date: https://rd.springer.com/chapter/10.1007/978-1-4302-6527-6_8. Jan. 4, 2014, pp. 365-428.

"Summon to Attend Oral Proceedings Issued in European Patent Application No. 16781604.0", dated Aug. 16, 2019, 1 Page.

"Oral Hearing Issued in European Patent Application No. 16781604.0", dated May 29, 2019, 08 Pages.

"Summons to Attend Oral Proceedings Issued in European Patent Application No. 16725636.1", Mailed Date: Oct. 31, 2019, 6 Pages.

"Office Action Issued in European Patent Application No. 16781604.0", dated Nov. 27, 2019, 14 Pages.

* cited by examiner

CLOUD-MASTERED SETTINGS

CROSS-REFERENCE TO RELATED APPLICATION

The present application is based on and claims the benefit of U.S. provisional patent application Ser. No. 62/155,596, filed May 1, 2015, the content of which is hereby incorporated by reference in its entirety.

BACKGROUND

Computer systems are currently in wide use. Some computer systems are local computer systems in that they operate in a geographically local location relative to the end user. Other computer systems operate in a remote server environment, such as in the cloud.

A single organization may use multiple different types of computer systems, deployed in multiple different computer system architectures. In addition, a client system may access data or resources from a variety of different locations. For instance, a client system may access information or resources from a local (or on-premise) cluster of servers. The same client system may also access information stored in one or more private cloud premises dedicated to an organization that deploys that client system, or the clients may access information from one or more public cloud premises. The public cloud premises may also be multi-tenant systems that are shared among many different customers.

Currently, an administrator in an organization that has multiple different computing systems or computing system architectures (e.g., multiple different premises) manages settings in each of those different premises, separately. By way of example, settings can include a set of rules or functional themes that are needed for the various different premises to function. Without these settings, the functionality in the premises would become void. As a concrete example, one set of settings may correspond to management rules that carry out a data loss prevention policy. One such rule, for instance, may specify that if a document or communication (e.g., an email transmission) has a social security number in it, then that document or other item must be treated in a certain way, or according to a certain policy (e.g., it may not be transmitted in an unencrypted form, it must be stored according to a certain security protocol, etc.).

The discussion above is merely provided for general background information and is not intended to be used as an aid in determining the scope of the claimed subject matter.

SUMMARY

A settings management system in a remote server environment generates user interface displays with settings management user input mechanisms, and detects actuation of those user input mechanisms. Settings configuration metadata is generated, for a given setting, based upon the detected actuation. The settings metadata is output for access by a plurality of different, heterogeneous, computing environments, and the settings metadata is consistent across all of those environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
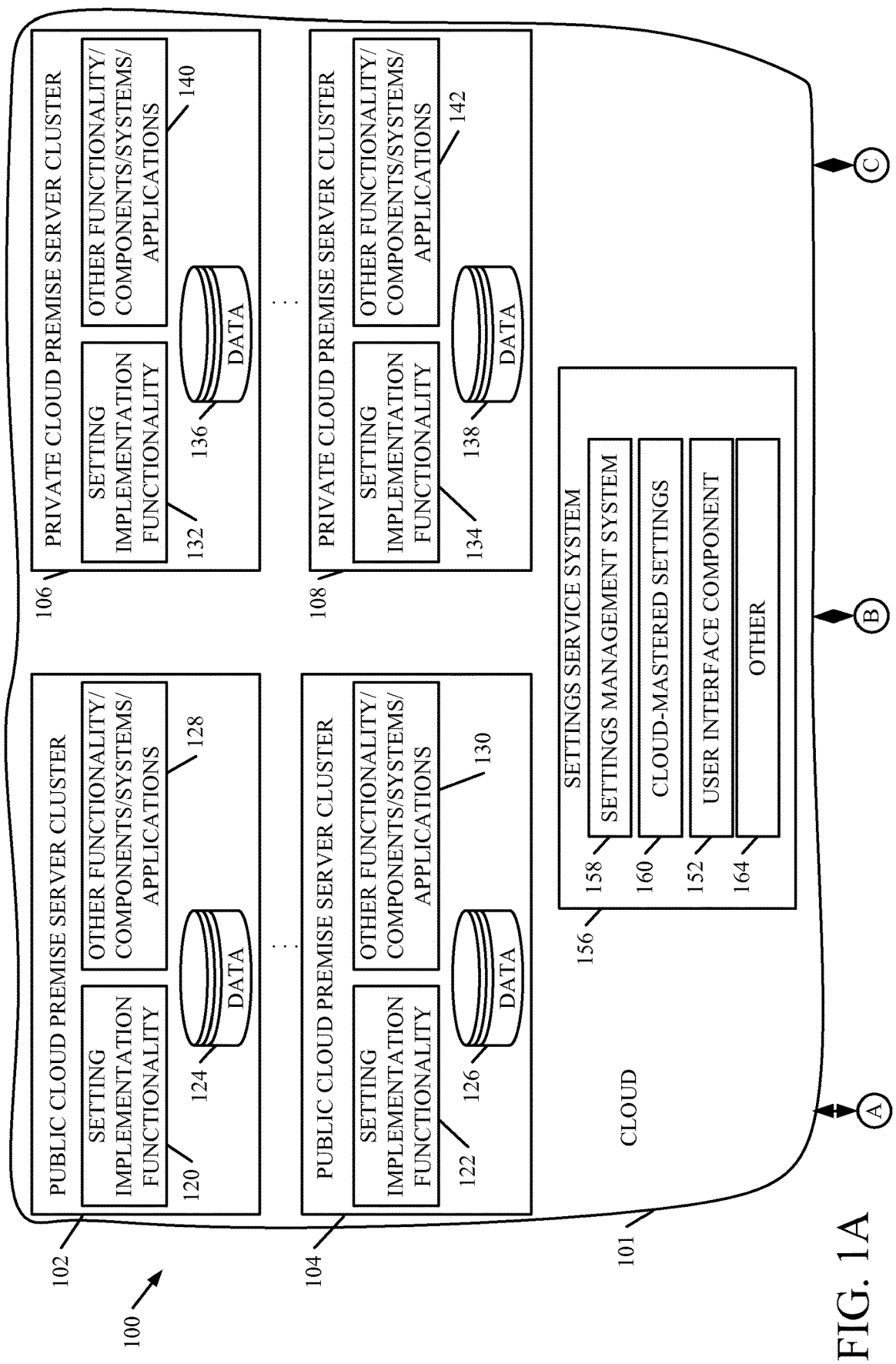
FIGS. 1A and 1B (collectively referred to as FIG. 1) show a block diagram of one example of a settings management architecture.
Figure 1B:
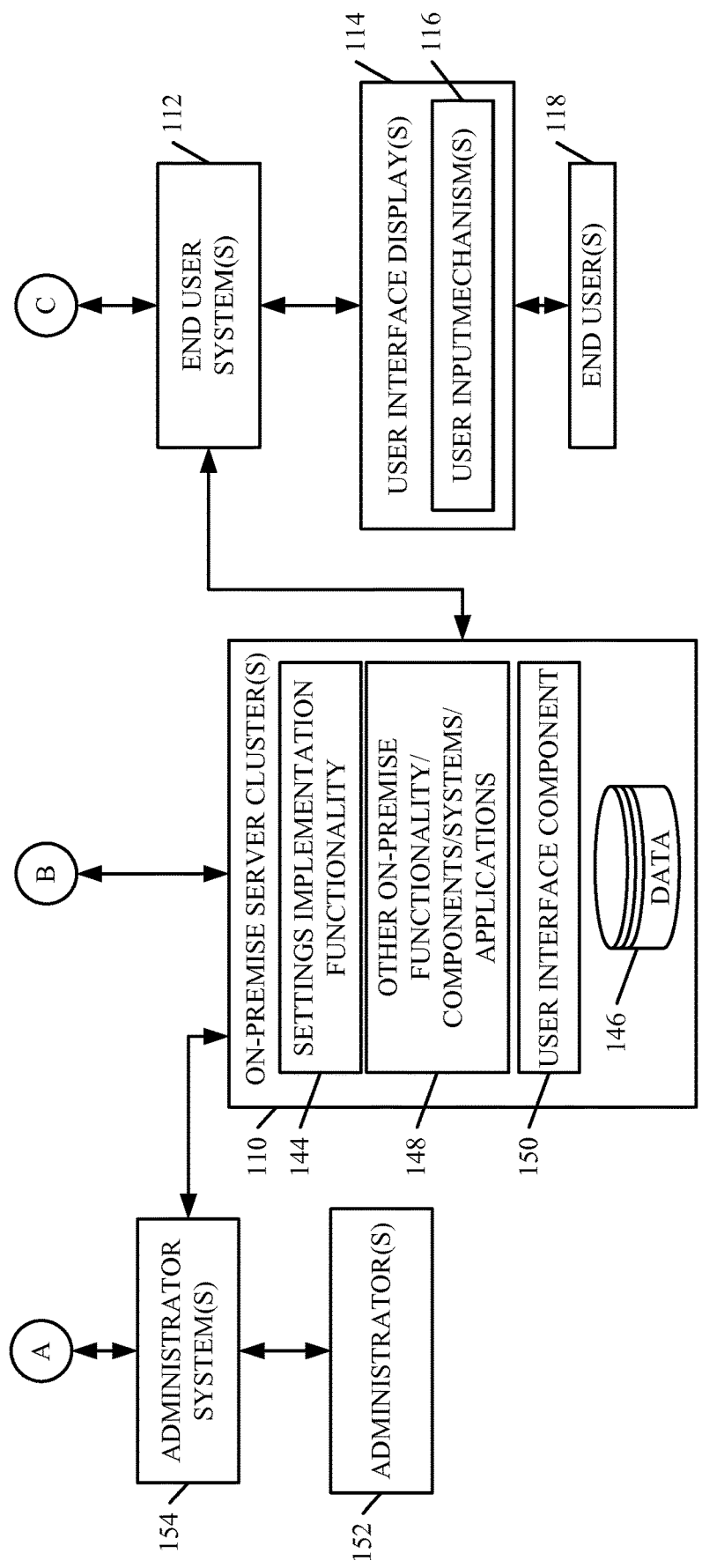

FIGS. 1A and 1B (collectively referred to as FIG. 1) show a block diagram of one example of a settings management architecture 100. Architecture 100 shows a plurality of different, heterogeneous, computing environments, or premises. For instance, architecture 100 shown in FIG. 1 includes a plurality of different public cloud premise server clusters 102-104 deployed in cloud 101. It also illustratively includes a set of private cloud premise server clusters 106-108, also in cloud 101. Architecture 100 also includes one or more on-premise server clusters 110.

Each of the public cloud premise server clusters 102-104 illustratively includes settings implementation functionality 120-122, data 124-126, and they can include other functionality, components, systems or applications 128-130. The settings implementation functionality 120-122 is illustratively used to deploy and honor (or implement) settings on the respective premises 102 and 104. Therefore, settings implementation functionality 120 may be the same as, or different from, settings implementation functionality 122, depending upon the particular way that each of the premises 102-104 deploys and implements (or honors) the various settings.

Each of the private cloud premise server clusters 106-108 also illustratively includes settings implementation functionality 132-134, data 136-138, and it can include other functionality, components, systems and applications 140-142. As with setting implementation functionality 120-122 in public cloud premises 102-104, settings implementation functionality 132-134 in private cloud premises 106-108 can be the same as, or different from, one another. They illustratively deploy and implement (or honor) administrative settings.

Each of the on-premise server clusters 110 also illustratively include settings implementation functionality 144, data 146, and they can include other on-premise functionality, components, systems or applications 148. They can include user interface components 150 as well. As with the setting implementation functionality discussed with respect to the other premises, functionality 144 can be the same or different, from one on-premise server cluster 110 to another. Suffice it to say that functionality 144 deploys and implements the settings according to the particular settings deployment and implementation operations that are performed on each on-premise cluster.

An organization can use any or all of these different types of heterogeneous computing environments (or premises). For instance, FIG. 1 shows that architecture 100 can include an end user system 112 that generates user interface displays 114, with user input mechanisms 116, for interaction by user 118. User 118 illustratively interacts with the user input mechanisms 116, in order to control and manipulate the different heterogeneous computing system environments 102-110, or a subset of them. By way of example, user 118 may access data or resources in on-premise server cluster 110. User 118 may also access data in any of the cloud-based premises (either the public or private cloud premises, or both) that are used by the organization that includes end user system 112.

In some current systems, an administrator 152 would use an administrator system 154 in order to create, configure and maintain the various different settings in each of the different premises 102, 104, 106, 108 and 110, separately. Thus, administrator 152 would normally need to understand how settings are created, deployed, implemented and maintained on each of those different premises. Similarly, when the administrator wished to deploy a new setting, or modify an existing setting, the administrator would normally need to do so in each of the different premises 102-110, separately, in order to ensure that the same settings are applied in all of the different premises used by the organization for which administrator 152 is performing administration.

Architecture 100, on the other hand, includes cloud-based settings service system 156. By way of overview, system 156 illustratively includes settings management system 158, a set of cloud-mastered settings 160, user interface component 162, and it can include other items 164. Settings management system 158 illustratively generates a user experience that is provided through administrator system 154 to administrator 152. The user experience allows administrator 152 to create and configure settings that are to be deployed and implemented in all of the different premises 102-110 (or a subset of them). System 158 then generates a set of metadata that defines each of the different settings and stores them as cloud-mastered settings 160. Settings 160 are then made available to each of the different premises 102-110. The settings are illustratively consistent, across all of the different heterogeneous premises 102-110. Each of the premises 102-110 then uses its own settings implementation functionality 120, 122, 132, 134 and 144, respectively, to access the settings, deploy them, and implement them according to the particular way that each of the different premises functions.

Figure 2:
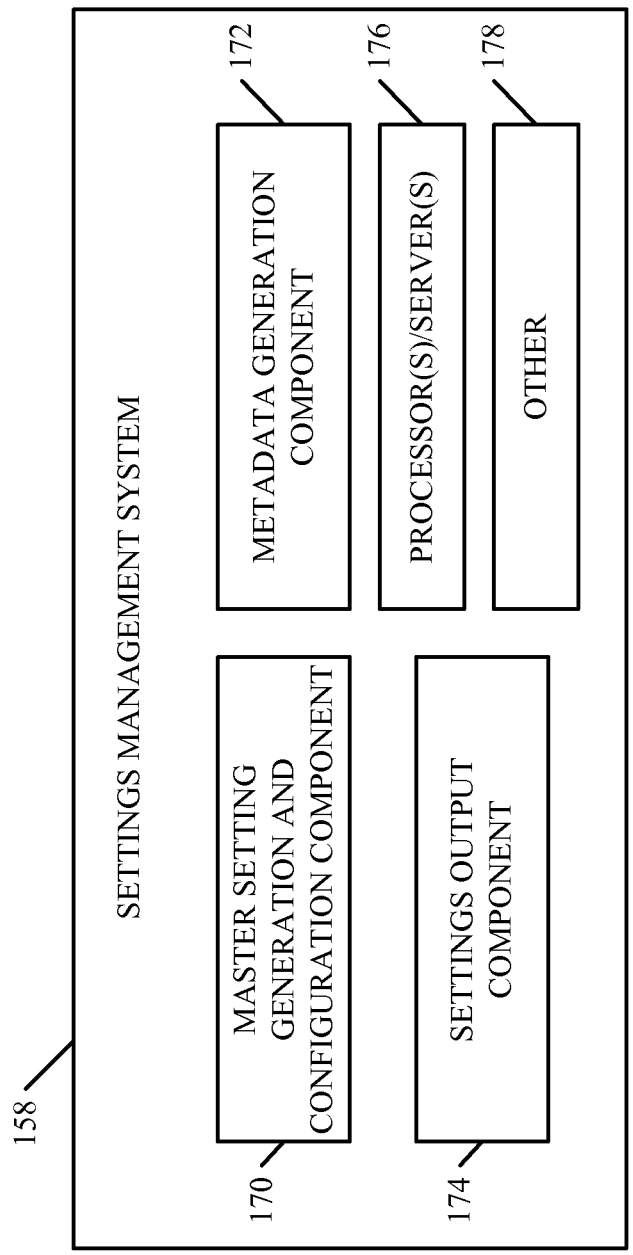
FIG. 2 is a more detailed block diagram of one example of a settings management system.

FIG. 2 is one example of a more detailed block diagram of settings management system 158. In the example shown in FIG. 2, system 158 illustratively includes a master setting generation and configuration component 170, metadata generation component 172, settings output component 174, a set of processors or servers 176, and it can include other items 178 as well. Master setting generation and configuration component 170 illustratively generates the user experience that provides user input mechanisms that allow administrator 152 to generate and configure various settings to be deployed in the various heterogeneous premises. It detects actuation of those user input mechanisms by administrator 152. Metadata generation component 172 generates a set of metadata corresponding to each of the settings, as configured by administrator 152, based upon the detected actuations of the user input mechanisms. Settings output component 174 illustratively outputs the cloud-mastered settings 160 (generated by metadata generation component 172) that represent the settings that have been created and configured by administrator 152. Those settings are made available to the various different premises 102-110 which, themselves, access the metadata (or receive it if it is sent by settings management system 158) and deploy the settings and implement them during runtime, according to their particular functionality.

Figure 3:
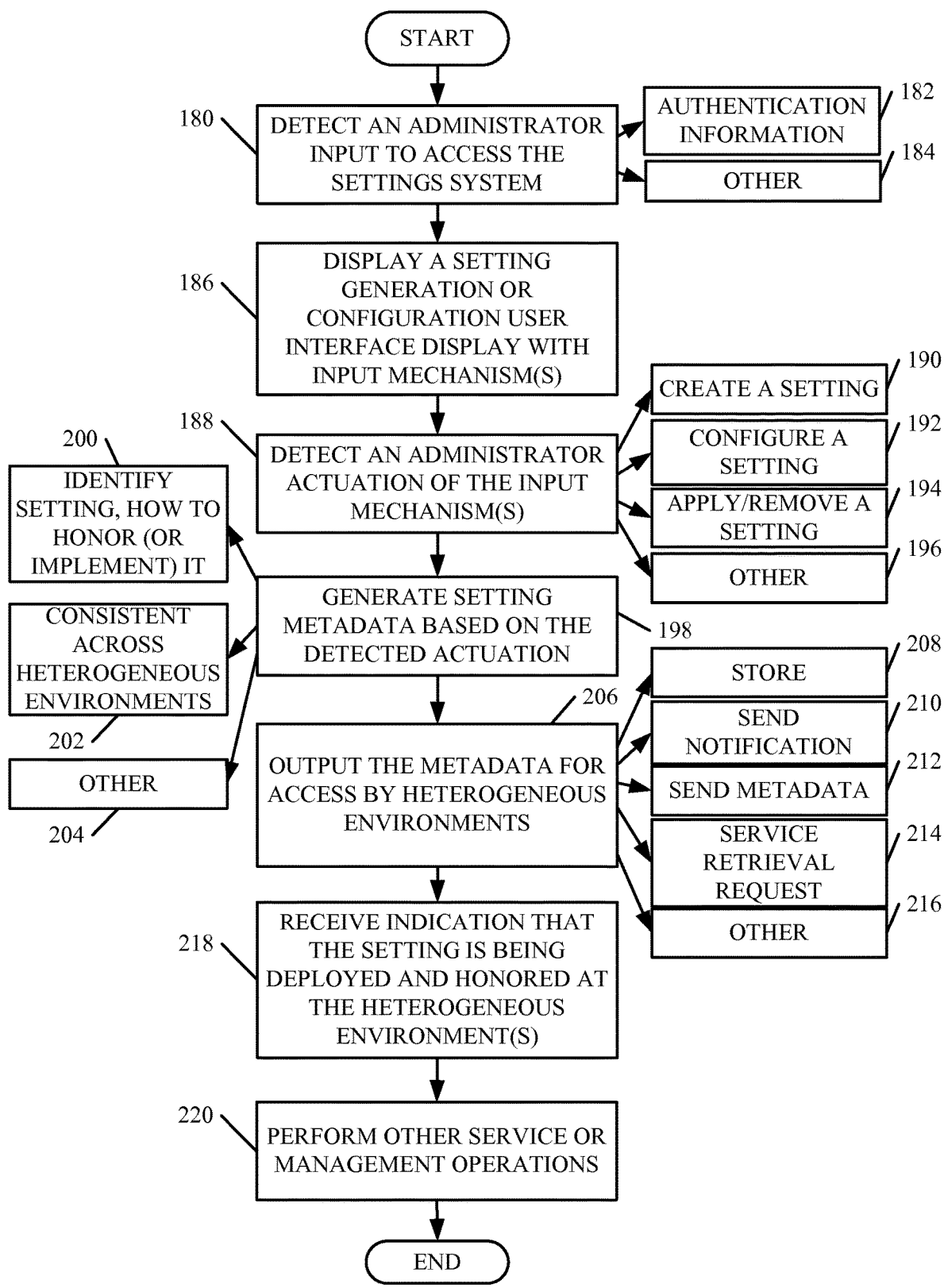
FIG. 3 is a flow diagram illustrating one example of the operation of the settings management system shown in FIG. 2.

FIG. 3 is a flow diagram illustrating one example of the operation of settings service system 156, in more detail. System 156 first detects an administrator input indicating that the administrator wishes to access the settings service system 156. This is indicated by block 180 in FIG. 3. For instance, administrator 152 may provide authentication information 182, or other information 184, indicating that the administrator 152 wishes to generate or configure settings.

In response, system 156 illustratively displays a settings generation or configuration user interface display with input mechanisms that allow administrator 152 to do this. This is indicated by block 186. Master setting generation and configuration component 170 then detects administrator actuation of those input mechanisms. This is indicated by block 188. This may indicate a variety of different things. For instance, it may indicate that administrator 152 has created a new setting 190. It may indicate that the administrator 152 has configured an existing setting 192, or that the administrator 152 has provided an input to apply or remove one or more settings 194. The administrator actuation of the input mechanism can indicate other things as well, and this indicated by block 196.

In response, metadata generation component 172 illustratively generates a set of setting metadata based on the detected actuation of the input mechanisms by administrator 152. This is indicated by block 198 in FIG. 3. In one example, the metadata identifies the particular setting and how it is to be honored or implemented on any premise that is deploying it. This is indicated by block 200. In one example, the metadata for a given setting is also consistent across all of the different heterogeneous environments or premises 102-110. That is, it is the same metadata, regardless of the premises that are to deploy and implement them. This is indicated by block 202. System 156 only needs to generate one set of cloud-mastered metadata representing each setting, and the particular premises 102-110 that are going to deploy the setting deploy and implement it, on their own, according to their own functionality. Administrator 152 thus need not attempt to manage individual settings on each of the different premises 102-110. Instead, administrator 152 need only manage the cloud-mastered settings 160, and it is up to each of the individual premises to deploy and implement those settings, and to report any management details or information back to administrator 152 through settings management system 158. The metadata can be generated in other ways as well, and this indicated by block 204.

Settings output component 174 then outputs the metadata for access by the different heterogeneous environments (or premises) 102-110. This is indicated by block 206. For instance, it can output the metadata to a settings metadata store 208, where it can be retrieved by the different premises 102-110. Component 174 can send a notification indicating that settings metadata is available and should be accessed by the different premises 102-110. This is indicated by block 210. Setting output component 174 can also send the metadata, itself, to the various premises 102-110. This is indicated by block 212. It can also receive requests from the various premises 102-110, and service those requests by sending the settings metadata in response to those requests. This is indicated by block 214. It can output the metadata for access by the heterogeneous environments in other ways as well, and this is indicated by block 216.

In one example, each of the different premises 102-110 then provide an acknowledgement or some type of indication that the setting has been deployed and is being honored (or implemented) at the different environments 102-110. Each of the different premises or environments 102-110 can also provide other types of management data to settings management system 158, which can then make that settings management data available to administrator 152. This is all indicated by block 218 in FIG. 3.

The settings service system 156 can, of course, perform a variety of other or different types of service operations or management operations as well. This is indicated by block 220.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that, in general, cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

As mentioned above, a public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 4:
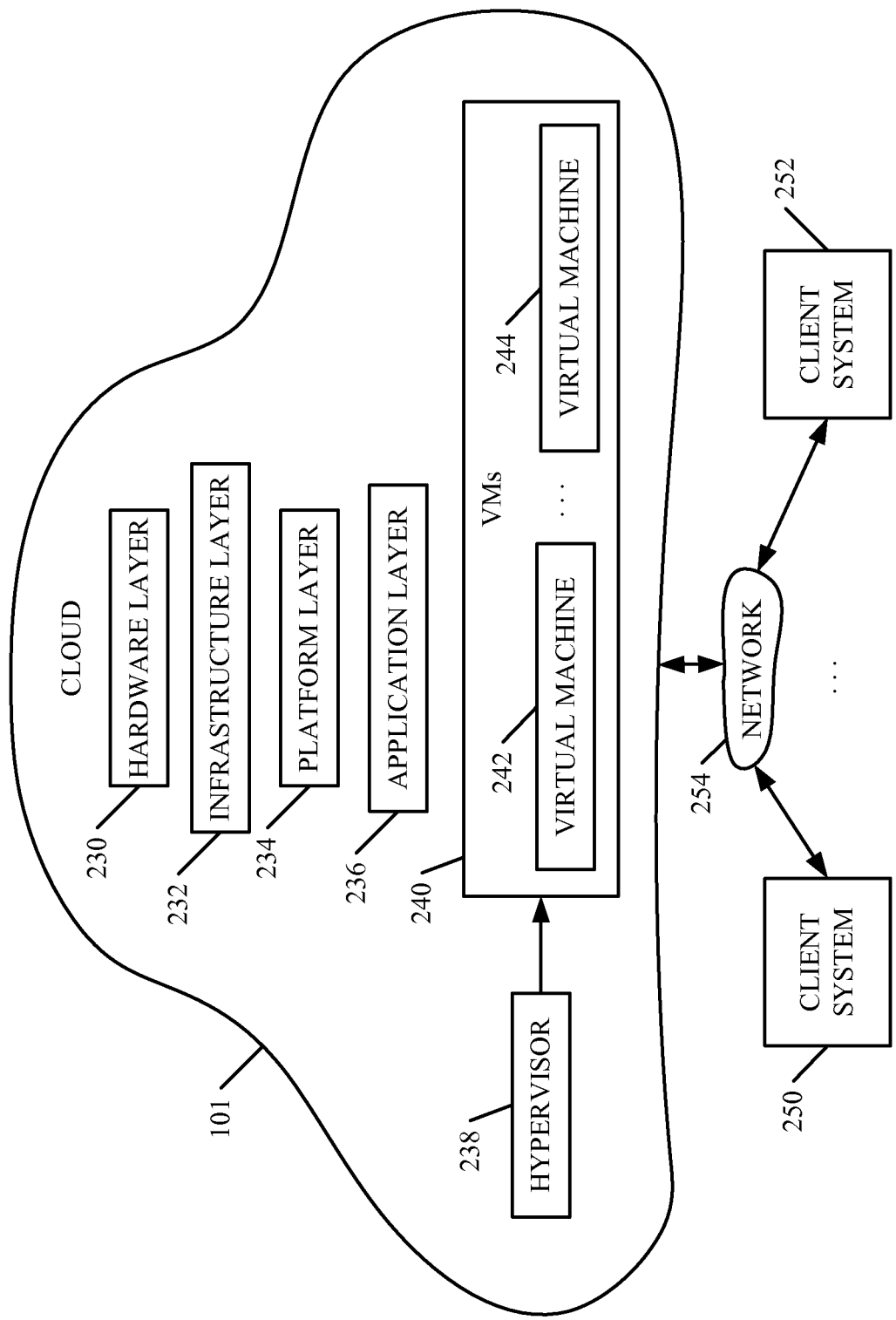
FIG. 4 is another block diagram of a cloud computing architecture.

FIG. 4 is a block diagram that describes other aspects of cloud 101, in more detail. It can be seen in FIG. 4 that cloud 101 (or each of the different premises on cloud 101) can include a hardware layer 230, an infrastructure layer 232, a platform layer 234, and an application layer 236. A hypervisor 238 can illustratively manage or supervise a set of virtual machines 240 that can include a plurality of different, independent, virtual machines 242-244. Each virtual machine can illustratively be an isolated software container that has an operating system and an application inside it. It is illustratively decoupled from its host server by hypervisor 238. In addition hypervisor 238 can spin up additional virtual machines 240, or close virtual machines 240, based upon workload or other processing criteria.

A plurality of different client systems 250-252 (which can be end user systems 112 or administrator systems 154, or both) can illustratively access cloud 101 over a network 254. Depending upon the type of service being used by each of the client systems 250-252, cloud 101 may provide different levels of service. In one example, the users of the different client systems are provided access to application software and databases. The cloud service then manages the infrastructure and platforms that run the application. This can be referred to as software as a service (or SaaS). The software providers operate application software in application layer 236 and end users access the software through the different client systems 250-252.

The cloud provider can also use platform layer 234 to provide a platform as a service (PaaS). This involves an operating system, programming language execution environment, database and webserver being provided to the client systems 250-252, as a service, from the cloud provider. Application developers then normally develop and run software applications on that cloud platform and the cloud provider manages the underlying hardware and infrastructure and software layers.

The cloud provider can also use infrastructure layer 234 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy applications, the cloud users that use IaaS install operating-system images and application software on the cloud infrastructure.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
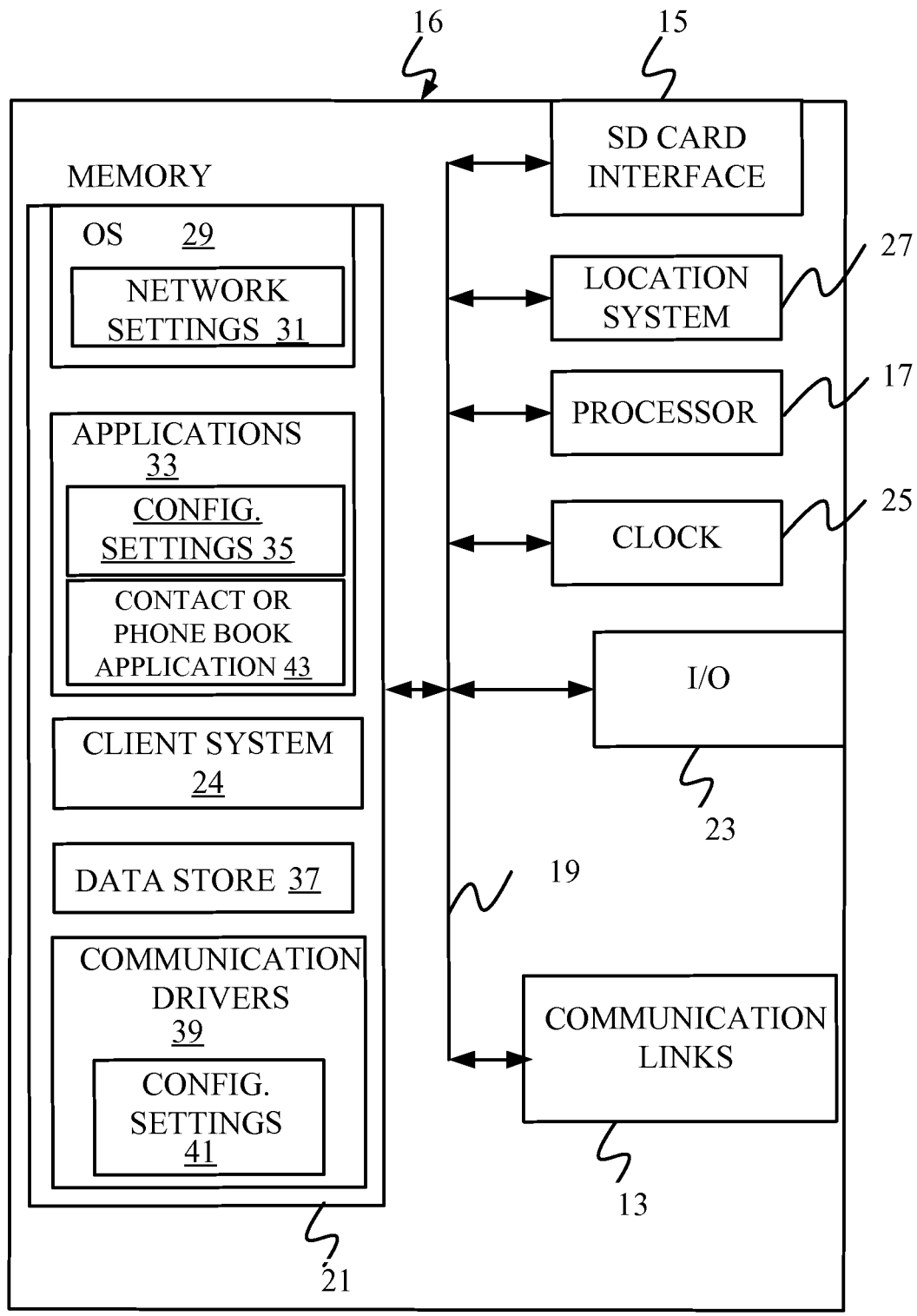
FIGS. 5-7 show examples of mobile devices that can be deployed in any of the architectures shown in previous figures.
Figure 6:
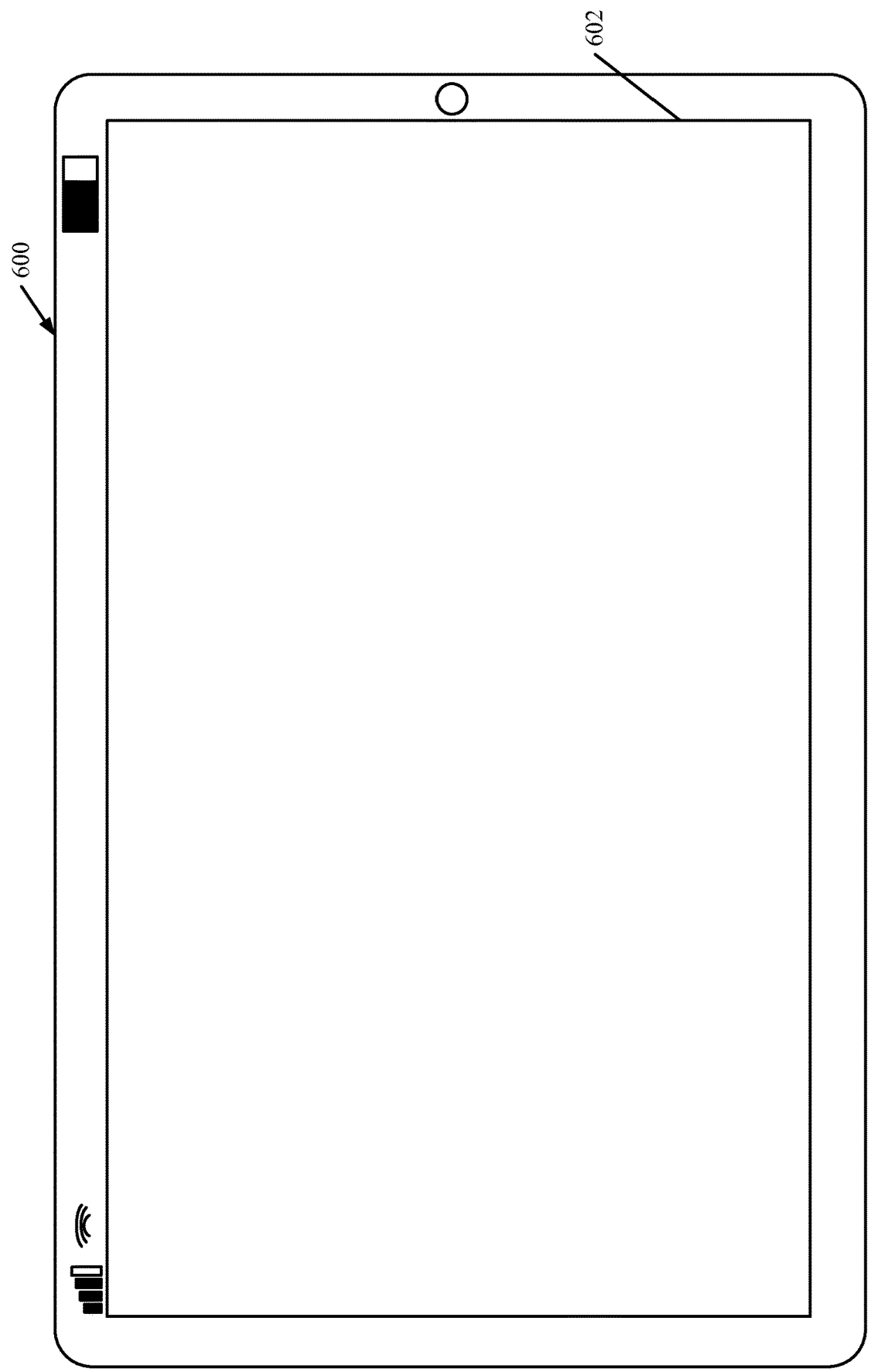
Figure 7:
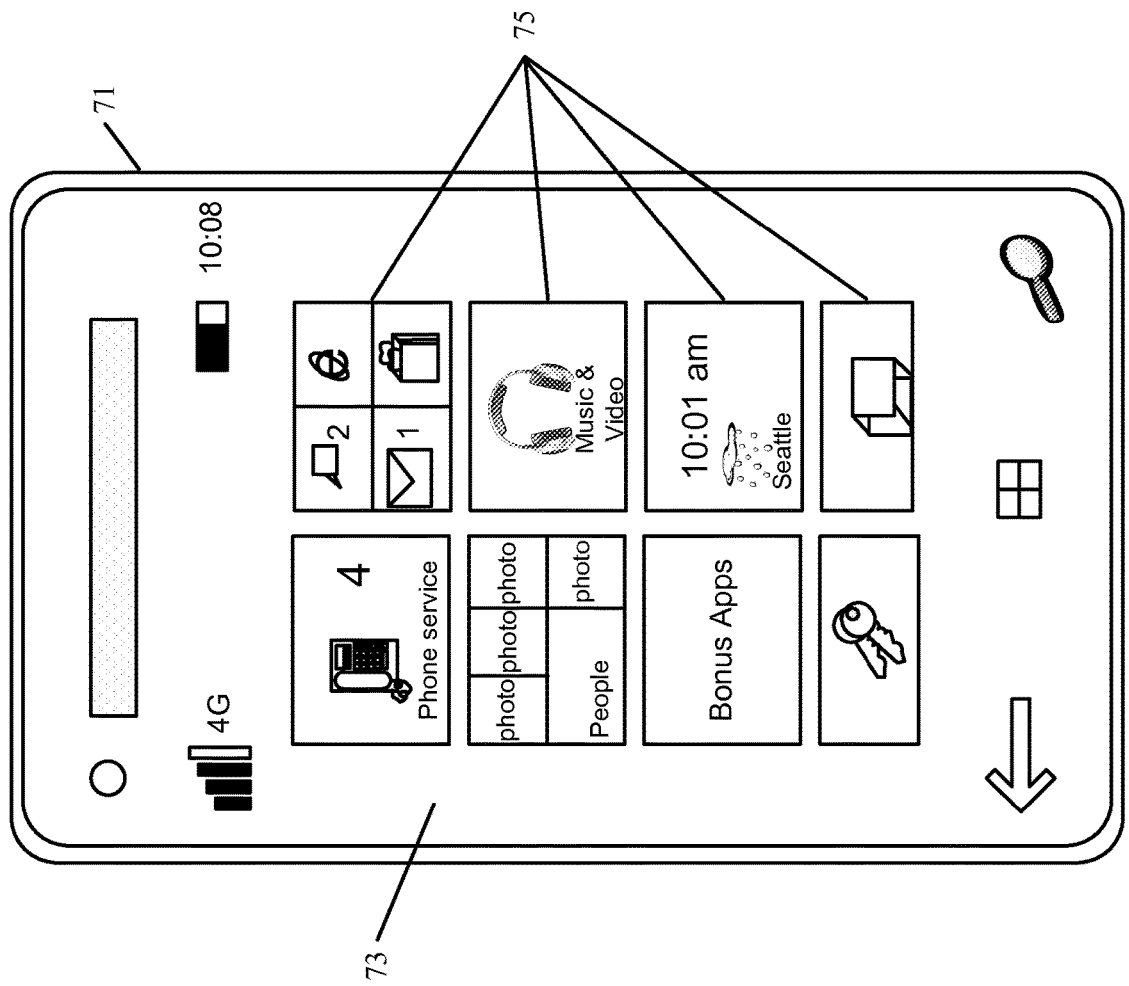

FIG. 5 is a simplified block diagram of one illustrative embodiment of a handheld or mobile computing device that can be used as a user's or client's hand held device 16, in which the present system (or parts of it) can be deployed. It can be used within architecture 100. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody processors or servers in any of the previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. The device can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples, the phone also includes a Secure Digital (SD) card slot 55 that accepts a SD card 57.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
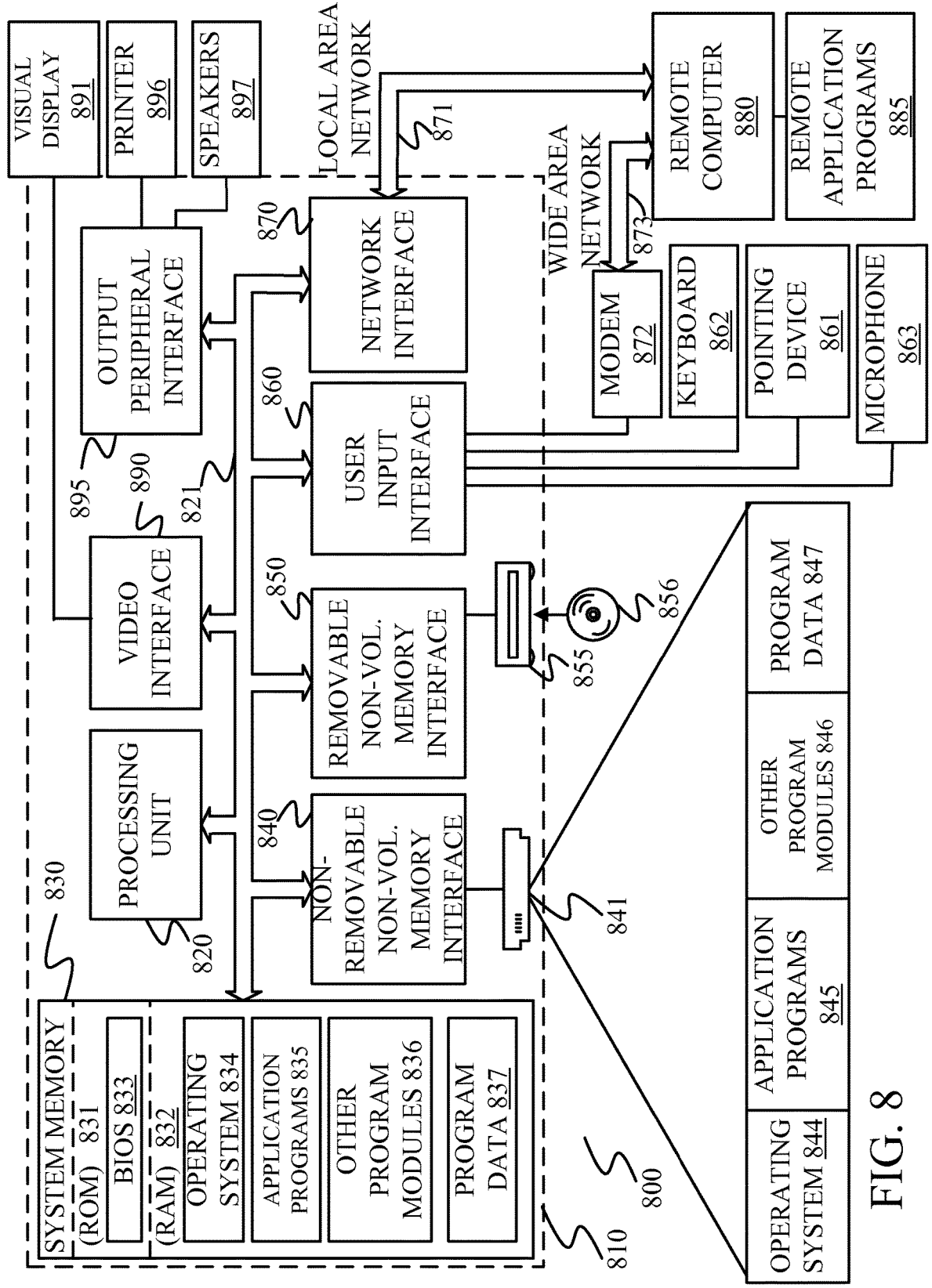
FIG. 8 is a block diagram of one example of a computing environment that can be deployed in any of the architectures of the previous figures.

FIG. 8 is one embodiment of a computing environment in which architecture 100, or parts of it, (for example) can be deployed. With reference to FIG. 8, an exemplary system for implementing some embodiments includes a general-purpose computing device in the form of a computer 810. Components of computer 810 may include, but are not limited to, a processing unit 820 (which can comprise processors or servers in previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user interface component;
a master settings configuration component that controls the user interface component to surface a settings configuration user input mechanism and to detect actuation of the settings configuration user input mechanism, which is indicative of a settings configuration input configuring a setting for a tenant that uses a plurality of different premises;
a metadata generation component that generates a set of premise-independent settings metadata, independent of the plurality of different premises on which the configured setting is to be deployed, based on the settings configuration input, and indicative of the configured setting; and
a settings output component that outputs the set of premise-independent settings metadata for access by each of the plurality of different premises.

Example 2 is the computing system of any or all previous examples wherein the plurality of different premises each include a corresponding server cluster that uses settings implementation functionality to implement the setting based on the set of premise-independent settings metadata, and wherein the metadata generation component is configured to generate the set of premise-independent settings metadata independent of the settings implementation functionality used by the server clusters.

Example 3 is the computing system of any or all previous examples wherein the metadata generation component is configured to generate the set of premise-independent settings metadata to identify the setting and a setting value indicative of whether the setting is to be applied to the premise, the settings implementation functionality implementing application of the setting.

Example 4 is the computing system of any or all previous examples wherein the plurality of different premises each include a corresponding server cluster that implements application functionality on the corresponding premise, and wherein the metadata generation component is configured to generate the set of premise-independent settings metadata independent of the application functionality implemented by the server clusters.

Example 5 is the computing system of any or all previous examples wherein the settings output component is configured to service setting retrieval requests from the server clusters corresponding to the different premises.

Example 6 is the computing system of any or all previous examples wherein the settings output component is configured to service setting retrieval requests from a first premise and a second premise, wherein the first and second premises each comprise at least one of a local, on-premise computing system, a private cloud-based premise, or a public cloud-based premise.

Example 7 is the computing system of any or all previous examples wherein the settings output component is configured to send the set of premise-independent settings metadata to the plurality of different premises for the tenant.

Example 8 is the computing system of any or all previous examples wherein the settings output component is configured to receive an implementation status indication from each of the plurality of different premises that indicate that the setting has been implemented and to generate a status output indicative of the implementation status indication received from each of the plurality of different premises.

Example 9 is the computing system of any or all previous examples wherein the master settings configuration component controls the user interface component to surface the settings configuration user input mechanism to be actuated to create a new setting, modify the setting, apply an existing setting, or remove the setting.

Example 10 is a computing system, comprising:
a user interface component;
a cloud-based settings management system that controls the user interface component to surface a settings management user input mechanism and to detect actuation of the settings management user input mechanism, which is indicative of a settings management input performing a management step on a setting for a tenant that uses a plurality of different premises;
a cloud-based settings store that stores a set of cloud-mastered settings for the plurality of different premises, the cloud mastered settings being stored in a premise-independent form that is independent of the plurality of different premises in which the settings are applied for the tenant; and
a settings output component that outputs the set of premise-independent settings metadata for access by each of the plurality of different premises.

Example 11 is the computing system of any or all previous examples wherein the cloud-based settings management system comprises:
a master settings configuration component that controls the user interface component to surface a settings configuration user input mechanism and to detect actuation of the settings configuration user input mechanism, which is indicative of a settings configuration input configuring the setting for the tenant that uses the plurality of different premises.

Example 12 is the computing system of any or all previous examples wherein the cloud-based settings management system comprises:
a metadata generation component that generates a set of premise-independent settings metadata, independent of the plurality of different premises on which the configured setting is to be deployed, based on the settings configuration input, and indicative of the configured setting.

Example 13 is a computer implemented method, comprising:
controlling a user interface component to surface a settings management user input mechanism;
detecting actuation of the settings management user input mechanism, which is indicative of a settings management input performing a management step on a setting for a tenant that uses a plurality of different premises;
storing a set of cloud-mastered settings for the plurality of different premises on a cloud-based data store, the cloud mastered settings being stored in a premise-independent form that is independent of the plurality of different premises in which the settings are applied for the tenant; and
servicing settings retrieval requests, for the set of premise-independent settings metadata, by each of the plurality of different premises.

Example 14 is the computer implemented method of any or all previous examples wherein controlling the user interface component comprises controlling the user interface component to surface a settings configuration user input mechanism, and wherein detecting actuation comprises:

detecting actuation of the settings configuration user input mechanism, which is indicative of a settings configuration input; and configuring the setting for the tenant that uses the plurality of different premises based on the settings configuration input.

Example 15 is the computer implemented method of any or all previous examples wherein configuring the setting comprises:

generating a set of premise-independent settings metadata, independent of the plurality of different premises on which the configured setting is to be deployed, based on the settings configuration input, and indicative of the configured setting.

Example 16 is the computer implemented method of any or all previous examples wherein the plurality of different premises each include a corresponding server cluster that uses settings implementation functionality to implement the setting based on the set of premise-independent settings metadata, and wherein generating the set of premise-independent settings metadata comprises:

generating the set of premise-independent settings metadata independent of the settings implementation functionality used by the server clusters.

Example 17 is the computer implemented method of any or all previous examples wherein generating the set of premise-independent settings metadata comprises:

generating the set of premise-independent settings metadata to identify the setting and a setting value indicative of whether the setting is to be applied to the premise, the settings implementation functionality implementing application of the setting.

Example 18 is the computer implemented method of any or all previous examples wherein the plurality of different premises each include a corresponding server cluster that implements application functionality on the corresponding premise, and wherein generating the set of premise-independent metadata comprises:

generating the set of premise-independent settings metadata independent of the application functionality implemented by the server clusters.

Example 19 is the computer implemented method of any or all previous examples wherein servicing settings retrieval requests comprises:

servicing settings retrieval requests from a first premise and a second premise, wherein the first and second premises each comprise at least one of a local, on-premise computing system, a private cloud-based premise, or a public cloud-based premise.

Example 20 is the computer implemented method of any or all previous examples and further comprising:

receiving an implementation status indication from each of the plurality of different premises that indicate that the setting has been implemented:

generating a status output indicative of the implementation status indication received from each of the plurality of different premises; and controlling the user interface component to display a status indicator based on the status output.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor; and
   memory storing instructions executable by the processor, wherein the instructions, when executed, configure the computing system to:
   generate a settings configuration user input mechanism;
   based on actuation of the settings configuration user input mechanism, configure settings for a tenant that includes:
      a first premise computing system having first settings implementation functionality configured to implement the configured settings on the first premise computing system; and
      a second premise computing system having second settings implementation functionality, that is different than the first settings implementation functionality, and configured to implement the configured settings on the second premise computing system;
   generate a set of premise-independent settings metadata that represents the configured settings for the tenant, wherein each premise-independent settings metadata, in the set of premise-independent settings metadata, defines one of the configured settings and is independent of both the first and second settings implementation functionality; and
   send the set of premise-independent settings metadata from the computing system to each of the first and second premise computing systems,
   wherein the first and second settings implementation functionality implement each configured setting with the same premise-independent settings metadata that defines the configured setting.

2. The computing system of claim 1 wherein each of the first and second premise computing systems includes:
   a corresponding server cluster configured to:
      receive the set of premise-independent settings metadata from the computing system; and
      use the settings implementation functionality, associated with the corresponding server cluster, to implement the configured setting based on the received set of premise-independent settings metadata.

3. The computing system of claim 1 wherein the instructions configure the computing system to:
   generate a setting value that indicates, to each of the first and second premise computing systems, that the premise-independent settings metadata is to be applied by the first and second settings implementation functionality.

4. The computing system of claim 1 wherein each of the first and second premise computing systems includes:
   a corresponding server cluster configured to:
      receive the set of premise-independent settings metadata from the computing system; and
      use the configured setting with application functionality, associated with corresponding server cluster, and wherein the instructions configure the computing system to generate the set of premise-independent settings metadata independent of the application functionality implemented by the server clusters.

5. The computing system of claim 1 wherein the instructions configure the computing system to:

receive setting retrieval requests from the server clusters corresponding to the first and second premise computing systems; and service the setting retrieval requests by sending the set of premise-independent settings metadata to the first and second premise computing systems.

6. The computing system of claim 5 wherein the instructions configure the computing system to:

service a first setting retrieval request from the first premise computing system by sending the set of premise-independent settings metadata to the first premise computing system; and service a second setting retrieval request from the second premise computing system by sending the set of premise-independent settings metadata to the second premise computing system, wherein the first and second premise computing system each comprise at least one of:
a local, on-premise computing system,
a private cloud-based premise, or
a public cloud-based premise.

7. The computing system of claim 3 wherein the instructions configure the computing system to receive an implementation status indication from each of the first and second premise computing systems that indicate that the setting has been implemented and to generate a status output indicative of the implementation status indication received from each of the first and second premise computing systems.

8. The computing system of claim 1 wherein the instructions configure the computing system to generate the settings configuration user input mechanism configured to be actuated to create a new setting, modify the setting, apply an existing setting, or remove the setting.

9. A computing system, comprising:
a processor; and
memory storing instructions executable by the processor, wherein the instructions, when executed, configure the computing system to:
generate a settings management user input mechanism;
receive an indication of a user input through the settings management user input mechanism, which is indicative of a settings management input performing a management step on a setting for a tenant that uses a plurality of different premise server clusters, wherein each particular premise server cluster is configured to use settings implementation functionality, associated with the particular premise server cluster, to implement the setting;
generate a premise-independent settings metadata that represents the setting, the premise-independent settings metadata being based on the management step and stored in a premise-independent form that is independent of the settings implementation functionality for each of the plurality of different premise server clusters; and
send the premise-independent settings metadata to each of the plurality of different premise server clusters, wherein each premise server cluster, of the plurality of different premise server clusters, implements the setting using the same premise-independent settings metadata sent to the premise server cluster.

10. The computing system of claim 9 wherein the instructions configure the computing system to:
generate a settings configuration user input mechanism; and
detect actuation of the settings configuration user input mechanism, which is indicative of a settings configuration input configuring a setting for the tenant that uses the plurality of different premise server clusters.

11. The computing system of claim 10 wherein the instructions configure the computing system to:
generate a setting value that indicates to each premise server cluster, of the premise server clusters, wherein the premise-independent settings metadata is to be applied by the premise server cluster.

12. A method performed by a computing system, the method comprising:
generating a settings management user input mechanism;
based on actuation of the settings management user input mechanism, defining a setting for a tenant that uses a plurality of different premise computing systems,
wherein each particular premise computing system is configured to use settings implementation functionality, associated with the particular premise computing system, to implement the setting on the particular premise computing system;
generating a premise-independent settings metadata that represents the setting for the tenant, wherein the premise-independent settings metadata is independent of the settings implementation functionality for each of the plurality of different premise computing systems in which the premise-independent settings metadata is applied for the tenant;
receiving setting retrieval requests from each of the plurality of different premise computing systems; and
servicing the setting retrieval requests by sending the premise-independent settings metadata to each of the plurality of different premise computing systems, wherein the settings implementation functionality for each of the plurality of premise computing systems implements the configured setting with the same premise-independent settings metadata.

13. The computer implemented method of claim 12 comprising:
generating a settings configuration user input mechanism;
detecting actuation of the settings configuration user input mechanism, which is indicative of a settings configuration input; and
configuring the setting for the tenant that uses the plurality of different premise computing systems based on the settings configuration input.

14. The computer implemented method of claim 13 wherein the plurality of different premise computing systems each include a corresponding server cluster that uses the settings implementation functionality to implement the configured setting based on the premise-independent settings metadata.

15. The computer implemented method of claim 13 wherein generating the set of premise-independent settings metadata comprises:
generating the premise-independent settings metadata to identify the configured setting and a setting value indicative of whether the configured setting is to be applied to each premise computing system,
the settings implementation functionality of each premise computing system being configured to apply the configured setting based on whether the setting value indicates that the configured setting is to be applied to the particular premise computing system.

16. The computer implemented method of claim 13 wherein the plurality of different premise computing systems each include a corresponding server cluster that implements application functionality on the corresponding premise, and wherein generating the premise-independent metadata comprises:
  generating the premise-independent settings metadata independent of the application functionality implemented by the server clusters.

17. The computer implemented method of claim 12 wherein servicing setting retrieval requests comprises:
  servicing a first setting retrieval request from a first one of the premise computing systems by sending the premise-independent settings metadata to the first premise computing system; and
  servicing a second setting retrieval request from a second one of the premise computing systems by sending the premise-independent settings metadata to the second premise computing system,
  wherein the first and second premise computing systems each comprise at least one of:
    a local, on-premise computing system,
    a private cloud-based premise computing system, or
    a public cloud-based premise computing system.

18. The computer implemented method of claim 17 and further comprising:
  receiving an implementation status indication from each of the plurality of different premise computing systems that indicate that the setting has been implemented:
  generating a status output indicative of the implementation status indication received from each of the plurality of different premise computing systems; and
  generating a status indicator based on the status output.

* * * * *